3,639,651
COVULCANIZABLE RUBBER COMPOSITION
Keiji Komuro, Tokyo, Masaaki Inagami, Kohoku-ku, Yokohama, and Yoshiomi Saito, Kanagawa-ken, Japan, assignors to The Japanese Geon Company, Ltd., Tokyo, Japan
No Drawing. Filed Mar. 4, 1969, Ser. No. 804,274
Claims priority, application Japan, Mar. 9, 1968, 43/14,956
Int. Cl. C08d *9/08*
U.S. Cl. 260—23.7 M                     3 Claims

ABSTRACT OF THE DISCLOSURE

A covulcanizable composition which comprises a mixture of 5–95% by weight of butadiene-acrylonitrile copolymer rubber and 95–5% by weight of epichlorohydrin polymer rubber, and a vulcanization agent consisting of, per 100 parts by weight of the first mixture, (I) 0.5–5.0 parts by weight of a member selected from the group consisting of aromatic polyamines, their salts, aliphatic polyamines, their salts, cycloaliphatic polyamines, 2-mercaptoimidazoline, 2 - mercaptopyrimidin, thiourea and substituted thiourea, (II) 1.0–10.0 parts by weight of an oxide, aromatic carboxylate, aliphatic carboxylate or phosphate of a metal selected from the group consisting of magnesium, calcium, zinc, cadmium, lead and tin, and (III) 0.3–3.0 parts by weight of an organic peroxide.

---

This invention relates to a covulcanizable rubber composition comprising a butadiene-acrylonitrile copolymer rubber and an epichlorohydrin polymer rubber.

Conventionally, rubbers of different types have been blended in various purposes, to provide various rubber compositions. In such blending, however, normally the properties of a resulting composition approach to those of the inferior component among the constituents employed. This phenomenon is particularly remarkable in respect of strength characteristics, which obviously is objectionable. This tendency is more conspicuous in cases of blending rubbers of different vulcanization systems. Thus, blended compositions of butadiene-acrylonitrile copolymer rubber and epichlorohydrin polymer rubber are also subject to this drawback.

Butadiene-acrylonitrile copolymer rubber (hereinafter will be abbreviated as NBR) exhibits excellent oil resistance and heat stability, and has been used for many years as oil-resistant and heat-stable rubber, particularly in the field of industrial parts. The same rubber, however, shows an inferior weatherability and ozone resistance. Therefore, it is desirable to impart still better oil- and heat-resistant properties to the rubber, as well as to improve its weatherability and ozone resistance.

Whereas, epichlorohydrin polymer rubber (hereinafter will be abbreviated as CHR) exhibits superior oil resistance, heat stability, weatherability, and ozone resistance to those of NBR, but is inferior in strength properties.

Accordingly, it was expected that when NBR and CHR are blended, a rubber composition of favorable properties would be obtained by the components' mutual compensation of respective shortcoming. However, since NBR and CHR are of entirely different vulcanization systems, compositions of only unsatisfactory properties are obtained due to non-uniform vulcanization, when known vulcanization agents are employed. Then U.S. Pat. No. 3,351,517 proposes one method of covulcanizing epichlorohydrin copolymer and sulfur-vulcanizable rubber, in which the vulcanization agent comprises (1) an organic vulcanization accelerator such as 2-mercaptoimidazoline, 2-mercaptopyrimidin, or thiourea, (2) a salt or oxide of a metal belonging to II–A, II–B, III–A, IV–A, or V–A Group of Periodic Table, and (3) sulfur. However, so obtained covulcanized product exhibits unsatisfactory strength properties such as tensile strength and abrasion resistance, and furthermore markedly inferior elasticity.

Accordingly, therefore, the object of the invention is to provide compositions of excellent heat- and oil-resistances, and improved strength properties, weatherability, ozone resistance and elasticity, by blending of NBR and CHR.

The above object of the invention is accomplished by the use of a vulcanization agent consisting of (I) a member of the group consisting of aromatic polyamines, salts thereof, aliphatic polyamines, salts thereof, cycloaliphatic polyamines, 2-mercaptoimidazoline, 2-mercaptopyrimidin, thiourea and substituted thiourea,
(II) an oxide, aromatic carboxylate, aliphatic carboxylate, or phosphate of a metal selected from the group consisting of magnesium, calcium, zinc, cadmium, lead and tin, and
(III) an organic peroxide for covulcanization of NBR and CHR.

The precise mechanism with which the foregoing excellent result is obtained is not yet clear. However, in accordance with the invention, it is possible to assimilate the vulcanization progressing conditions of NBR and CHR. Accordingly an even or uniform vulcanization of the blended composition can be expected, and in certain cases cross-linkage advances between NBR and CHR.

The blending ratio of NBR and CHR in the compositions of the invention can be optionally varied within the ranges of 5–95 wt. percent of NBR and 95–5 wt. percent of CHR, while the desired effects of the invention are achieved most conspicuously at the ratios of 20–80 wt. percent of NBR to 80–20 wt. percent of CHR. Individual blending ratio should be determined in accordance with the specific utility to be obtained. For instance, it is recommended to use at least 20 wt. percent of CHR for improving ozone resistance of NBR, and also at least 30 wt. percent of the former for improving the heat and oil resistances of the latter. Likewise, at least 15 wt. percent of NBR should be used to improve strength properties, compression set, and Williams abrasion of CHR.

The vulcanization system of the invention is composed of the above-described three components in combination. Examples of the first component (I) include paraphenylenediamine, naphthalenediamine, ethylenediamine, hexamethylenediamine, salts of those polyamines, melamine, piperazine, 2-mercaptoimidazoline, 2-mercaptopyrimidine, thiourea, ethylenethiourea, trimethylthiourea, diethylthiourea and dibutylthiourea. Examples of the second component (II) include oxides of magnesium, calcium, zinc, cadmium, lead and tin; magnesium benzoate, calcium benzoate, lead oleate, lead phthalate, and magnesium phosphate. Among the named metallic compounds, those of lead, magnesium and zinc give the most favorable results. All of the above-named first and second components are known as vulcanization agents of CHR, and presumably function mainly as such agents for CHR also in the blended compositions of the invention. Examples of the third component (III) include benzoyl peroxide, tertiary butyl hydroperoxide, ditertiary butyl peroxide, dicumyl peroxide, dichloro-dibenzoyl peroxide, etc.

In order to accomplish the object of this invention, normally 0.5–5.0 wt. parts of the first component, 1.0–10.0 wt. parts of the second component, and 0.3–3.0 wt. parts of the third component, are added to 100 wt. parts of a NBR-CHR mixture. Since the components do not affect each other in the described vulcanization system of the invention, a stable blended composition can be obtained. The respective amount of the three vulcanization agents should be determined in accordance with the blending ratio of NBR and CHR, so that the vulcanization rates of the rubbers should become equal if all possible. For example, if the correlation of the addition amount of mixture of the first component (amines) and second component (metallic compounds) versus vulcanization rate of CHR, and the correlation of addition amount of the third component (organic peroxides) versus vulcanization rate of NBR are empirically determined in advance, the respective amounts of the three components required in correspondence to any specific blending ratio of NBR and CHR can be easily calculated.

The NBR employed in the invention includes all butadieneacrylonitrile copolymer rubbers obtained by conventional emulsion or solution polymerization, so far as their Mooney viscosities $ML_{1+4}$ (100° C.), are within the range of 30–130, regardless of their acrylonitrile contents. Also as useful CHR, epichlorohydrin homopolymer rubber and copolymer rubbers of epichlorohydrin with olefin oxides such as ethylene and propylene oxides may be named. Any of such epichlorohydrin-containing polymer rubber can be used in this invention, so far as its Mooney viscosity, $ML_{1+4}$ (100° C.), is within the range of 40–140.

In the preparation of subject compositions, processing assistants, filters, softening agent etc. may be optionally employed.

The compositions of the invention are milled by mixers such as roll mill and Banbury's mixers, and vulcanized in conventional manner. The resulting vulcanized products exhibit excellent properties such as high tensile strength, heat and oil resistances, resistance to compression set, abrasion resistance and ozone resistance, and possess wide utilities.

Hereinafter the characteristics of the subject compositions will be demonstrated by way of examples and controls, in which all parts are by weight.

EXAMPLES 1–3 AND CONTROLS 1–2

Compositions were prepared at the blending ratios specified in Table 1, which were subsequently milled with an open roll for 30 minutes at 50–80° C., and vulcanized for 30 minutes at 155° C. The NBR employed was a butadiene-acrylonitrile copolymer containing 32–35 wt. percent of acrylonitrile, having a Mooney viscosity, $ML_{1+4}$ (100° C.), of 70. The CHR was an epichlorohydrin homopolymer having a Mooney viscosity, $ML_{1+4}$ (100° C.), of 67. (Unless otherwise specified, the identical NBR and CHR were used in all of the following examples and controls.) Also for comparison, NBR alone and CHR alone were similarly milled and vulcanized in Controls 1 and 2.

TABLE 1

| Composition | Control 1 | Example 1 | Example 2 | Example 3 | Control 2 |
|---|---|---|---|---|---|
| NBR | 100 | 75 | 50 | 25 | |
| CHR | | 25 | 50 | 75 | 100 |
| Carbon black N550 | 30 | 30 | 30 | 30 | 30 |
| Zinc stearate | | 0.25 | 0.5 | 0.75 | 1.0 |
| Red lead | | 1.25 | 2.5 | 3.75 | 5.0 |
| Hexamethylenediamine carbamate | | 0.5 | 1.0 | 1.5 | 2.0 |
| Dicumyl peroxide | 1.5 | 1.13 | 0.75 | 0.37 | |

The physical properties of the vulcanized products were as given in Table 2.

TABLE 2

| Physical property | Control 1 | Example 1 | Example 2 | Example 3 | Control 2 |
|---|---|---|---|---|---|
| Tensile strength (kg./cm.²) | 201 | 198 | 196 | 178 | 169 |
| Elongation (percent) | 490 | 530 | 560 | 480 | 320 |
| 100% modulus (kg./cm.²) | 22 | 22 | 21 | 29 | 44 |
| Hardness (JIS) | 61–55 | 60–53 | 55–49 | 57–51 | 65–63 |
| Compression set, 100° C.×70 hrs. (percent) [1] | 18.2 | 25.1 | 29.1 | 33.5 | 53.0 |
| Williams abrasion (cc./HP· hr.) [2] | 690 | 640 | 450 | 620 | 910 |
| Air test tube, aged 6 days at 130° C.: | | | | | |
| Change in tensile strength (percent) | −74.2 | −39.9 | −27.0 | −17.4 | −15.7 |
| Change in elongation (percent) | −81.7 | −66.0 | −59.0 | −52.2 | −33.4 |
| Change in hardness | +9~+11 | +8~+9 | +9~+9 | +9~+8 | +10~+7 |
| Air test tube, aged 3 days at 150° C.: | | | | | |
| Change in tensile strength (percent) | −71.3 | −63.6 | −68.4 | −65.3 | −80.0 |
| Change in elongation (percent) | −73.0 | −81.2 | −82.0 | −66.8 | +22.2 |
| Change in hardness | +13~+15 | +7~+11 | +9~+9 | +3~−1 | −13~−18 |
| ASTM #3 oil, aged 70 hrs. at 100° C.: | | | | | |
| Change in tensile strength (percent) | −28.3 | −21.7 | −19.4 | −10.7 | −11.8 |
| Change in elongation (percent) | −16.3 | −18.8 | −10.7 | −10.4 | −19.3 |
| Change in 100% modulus (percent) | −27.3 | −22.7 | −19.0 | −20.7 | −2.4 |
| Change in hardness | −13~−9 | −12~−9 | −11~−7 | −9~−6 | −7~−7 |
| Change in volume (percent) | +19.9 | +19.2 | +13.6 | +12.2 | +9 |
| Ozone resistance, 100 p.p.m., 30° C., 20% elongation: Number of hours passed before first crack appeared | 2 | 17 | 136 | >320 | .4 ([3]) |

[1] Measured with products of 155° C., 45 minutes' vulcanization, according to ASTM D-395-61.
[2] Measured in accordance with ASTM D-394-59.
[3] No crack observed.

EXAMPLES 4–6 AND CONTROLS 3–4

Compositions were prepared at the blending ratios indicated in Table 3 below, and milled with an open roll for 30 minutes at 50–80° C., followed by 30 minutes' vulcanization at 155° C. Also for comparison, cases of similarly milling and vulcanizing NBR or CHR alone are also given as Controls 3 and 4. Note that Control 3 is identical with Control 1, which is given simply for convenient comparison.

TABLE 3

| Composition | Control 3 | Example 4 | Example 5 | Example 6 | Control 4 |
|---|---|---|---|---|---|
| NBR | 100 | 75 | 50 | 25 | |
| CHR | | 25 | 50 | 75 | 100 |
| Carbon black N550 | 30 | 30 | 30 | 30 | 30 |
| Zinc stearate | | 0.25 | 0.5 | 0.75 | 1.0 |
| Red lead | | 1.25 | 2.5 | 3.75 | 5.0 |
| 2-mercaptoimidazoline | | 0.75 | 1.5 | 2.25 | 3.0 |
| Dicumyl peroxide | 1.5 | 1.12 | 0.75 | 0.37 | |

The physical properties of the resulting vulcanization products are given in Table 4.

TABLE 4

| Physical property | Control 3 | Example 4 | Example 5 | Example 6 | Control 4 |
|---|---|---|---|---|---|
| Tensile strength (kg./cm.²) | 204 | 209 | 194 | 181 | 145 |
| Elongation (percent) | 490 | 570 | 500 | 450 | 330 |
| 100% modulus (kg./cm.²) | 22 | 22 | 24 | 30 | 42 |
| Hardness (JIS) | 61–55 | 57–51 | 57–52 | 59–54 | 65–63 |
| Compression set, 100° C.×70 hrs. (percent)[1] | 18.2 | 27.0 | 38.0 | 43.0 | 49.6 |
| Williams abrasion (cc./HP·hr.)[2] | 690 | 670 | 670 | 760 | 810 |
| Air test tube, aged 6 days at 130° C.: | | | | | |
|   Change in tensile strength (percent) | −74.2 | −49.2 | −41.8 | −22.1 | −6.9 |
|   Change in elongation (percent) | −81.7 | −73.6 | −72.0 | −64.5 | −54.5 |
|   Change in hardness | +9~+11 | +9~+13 | +11~+12 | +11~+12 | +10~+10 |
| Air test tube, aged 3 days at 150° C.: | | | | | |
|   Change in tensile strength (percent) | −71.8 | −70.9 | −77.5 | −63.5 | −11.7 |
|   Change in elongation (percent) | −73.0 | −86.0 | −86.0 | −80.0 | −36.4 |
|   Change in hardness | +13~+15 | +12~+15 | +13~+13 | +7~+7 | +3~+1 |
| ASTM #3 oil, aged 70 hrs. at 100° C.: | | | | | |
|   Change in tensile strength | −28.3 | −23.9 | −34.1 | −29.3 | −23.4 |
|   Change in elongation (percent) | −16.3 | −22.8 | −42.0 | −40.7 | −45.5 |
|   Change in 100% modulus (percent) | −27.3 | −13.6 | +16.7 | +26.6 | +38.1 |
|   Change in hardness | −13~−9 | −11~−7 | −5~−3 | −3~0 | −1~−1 |
|   Change in volume (percent) | +19.9 | +19.4 | +14.1 | +10.3 | +11.2 |
| Ozone resistance, 100 p.p.m., 30° C., 20% elongation: Number of hours passed before first crack appeared | 2 | 35 | >270 | >320 | (³) |

[1] Measured with products of 155° C., 45 minutes' vulcanization, according to ASTM D-395-61.
[2] Measured in accordance with ASTM D-394-59.
[3] No crack observed.

EXAMPLES 7–13

Compositions were prepared at the blending ratios indicated in Table 5 below, and milled with an open roll for 30 minutes at 50–80° C. followed by 30 minutes' vulcanization at 155° C.

TABLE 5

| Example | 7 | 8 | 9 | 10 | 11 | 12 | 13 |
|---|---|---|---|---|---|---|---|
| Composition: | | | | | | | |
| Butadiene (60), acrylonitrile (40) copolymer[1] | 50 | | | | | | |
| Butadiene (66), acrylonitrile (34) copolymer[2] | | 50 | | 50 | 50 | 50 | 50 |
| Butadiene (71), acrylonitrile (29) copolymer[3] | | | 50 | | | | |
| Epichlorohydrin homopolymer[4] | 50 | 50 | 50 | | | 50 | 50 |
| Epichlorohydrin (68), ethylene oxide (32) copolymer[5] | | | | 50 | 50 | | |
| Zinc stearate | 0.5 | 0.5 | 0.5 | 0.5 | 0.5 | 0.5 | 0.5 |
| Carbon black N550 | 30 | 30 | 30 | 30 | 30 | 30 | 30 |
| Magnesia | | | | | | 2.5 | |
| Calcium oxide | 2.5 | | | | | | |
| Zinc oxide | | | | | | 2.5 | |
| Cadmium oxide | | 2.5 | | | | | |
| Tin oxide | | | | 2.5 | | | |
| Diabasic lead phosphite | | | | | | 2.5 | |
| Lead stearate | | | | | | | 2.5 |
| Hexamethylene diamine carbamate | | | | 0.75 | 0.75 | | |
| 2-mercaptobenzimidazoline | 1.5 | 1.5 | 1.5 | | | 1.5 | 1.5 |
| Dicumyl peroxide | 1.5 | 1.5 | 1.5 | | | 1.5 | 1.5 |
| t-Butyl perbenzoate | | | | 1.7 | 1.7 | | |

[1] Mooney viscosity 78.
[2] Mooney viscosity 80.
[3] Mooney viscosity 75.
[4] Mooney viscosity 70.
[5] Mooney viscosity 81.

The physical properties of the vulcanized products were as given in Table 6.

TABLE 6

| Example | 7 | 8 | 9 | 10 | 11 | 12 | 13 |
|---|---|---|---|---|---|---|---|
| Physical property: | | | | | | | |
| Tensile strength (kg./cm.²) | 212 | 192 | 190 | 170 | 181 | 180 | 184 |
| Elongation (percent) | 610 | 590 | 650 | 480 | 560 | 370 | 510 |
| 100% modulus (kg./cm.²) | 20 | 22 | 17 | 21 | 16 | 39 | 24 |
| Hardness (JIS) | 56–50 | 56–50 | 55–49 | 55–50 | 53–48 | 60–57 | 57–52 |

CONTROLS 5–9

Compositions were prepared at the blending ratios given in Table 7, and milled with an open roll for 30 minutes at 50–80° C., followed by 30 minutes' vulcanization at 155° C.

TABLE 7

| Control | 5 | 6 | 7 | 8 | 9 |
|---|---|---|---|---|---|
| Composition: | | | | | |
| NBR | 100 | 75 | 50 | 25 | |
| CHR | | 25 | 50 | 75 | 100 |
| Carbon black N550 | 30 | 30 | 30 | 30 | 30 |
| Stearic acid | 1.0 | 0.75 | 0.5 | 0.25 | |
| Zinc oxide | 5 | 3.75 | 2.5 | 1.75 | |
| Sulfur | 1.5 | 1.18 | 1.25 | 0.37 | |
| Benzothiazolyl disulfide | 2.0 | 1.5 | 1.0 | 0.5 | |
| Red lead | | 1.75 | 2.5 | 3.75 | 5 |
| 2-mercaptoimidazoline | | 0.37 | 1.25 | 1.13 | 1.5 |

The physical properties of the resulting vulcanized products are given in Table 8.

TABLE 8

| 3 Control | 5 | 6 | 7 | 8 | 9 |
|---|---|---|---|---|---|
| Physical property: | | | | | |
| Tensile strength (kg./cm.$^2$) | 216 | 174 | 167 | 157 | 145 |
| Elongation (percent) | 380 | 370 | 320 | 320 | 330 |
| 100% modulus (kg./cm.$^2$) | 23 | 31 | 38 | 38 | 40 |
| Hardness (JIS) | 60–58 | 60–58 | 62–60 | 63–60 | 65–63 |
| Compression set, 100°C.×70 hrs. (percent)[1] | 47.3 | 40.2 | 34.9 | 40.5 | 55.0 |
| Williams abrasion (cc./HP·hr.)[2] | 570 | 790 | 940 | 900 | 1,010 |
| Air test tube, aged 6 days at 130°C: | | | | | |
| Change in tensile strength | –50.0 | –7.5 | –28.7 | –11.8 | –12.2 |
| Change in elongation (percent) | –75.8 | –59.4 | –68.7 | –58.2 | –55.8 |
| Change in hardness | +12~+11 | +15~+15 | +13~+13 | +13~+13 | +14~+14 |
| Air test tube, aged 3 days at 150°C.: | | | | | |
| Change in tensile strength (percent) | –62.7 | –31.0 | –40.7 | –20.9 | –13.0 |
| Change in elongation (percent) | –86.2 | –75.7 | –75.0 | –69.8 | –53.8 |
| Change in hardness | +11~+9 | +15~+15 | +14~+14 | +14~+13 | +9~+11 |
| ASTM #3 oil, aged 70 hrs. at 100°C.: | | | | | |
| Change in tensile strength | –8.3 | –8.1 | –7.2 | –5.1 | –4.6 |
| Change in elongation (percent) | –15.5 | –5.4 | –6.3 | –34.9 | –32.7 |
| Change in 100% modulus (percent) | –17.4 | –9.7 | –7.9 | +6.1 | +7.4 |
| Change in hardness | –5~–7 | –1~–1 | –3~–4 | +3~+2 | +6~+6 |
| Change in volume (percent) | +17.0 | +13.1 | +12.1 | +10.8 | +7.8 |
| Ozone resistance, 100 p.p.m., 30° C., 20% elongation: Number of hours passed before first crack appeared | 1.0 | 1.5 | 9 | 50 | (³) |

[1] Measured with products of 155° C., 45 minutes' vulcanization, according to ASTM D-395-61.
[2] Measured in accordance with ASTM D-394-59.
[3] No crack observed.

As can be understood from comparing the examples of this invention with the controls, the vulcanized products of NBR-CHR blended compositions in accordance with the invention show synergistically improved strength properties such as tensile strength and abrasion resistance, etc. and elasticity, with the increase of NBR content. It can be also understood that by the addition of CHR, ozone resistance of NBR is markedly improved. Thus the subject invention provides conspicuous and valuable improvement, in view of the fact that heretofore known vulcanized blends of different rubbers fail to show desirable properties, due to the unbalance in vulcanization state.

What is claimed is:

1. A covulcanizable composition which comprises a mixture of 5–95% by weight of a butadiene-acrylonitrile copolymer rubber and 95–5% by weight of an epichlorohydrin polymer rubber, said composition containing a vulcanization agent consisting of, per 100 parts by weight of said mixture of rubbers, (I) 0.5–5.0 parts by weight of a member selected from the group consisting of aromatic polyamines, salts of said aromatic polyamines, aliphatic polyamines, salts of said aliphatic polyamines, cycloaliphatic polyamines, 2 - mercaptoimidazoline, 2-mercaptopyrimidin, thiourea and substituted thiourea, (II) 1.0–10.0 parts by weight of an oxide, aromatic carboxylate, aliphatic carboxylate or phosphate of a metal selected from the group consisting of magnesium, calcium, zinc, cadmium, lead and tin, and (III) 0.3–3.0 parts by weight of an organic peroxide.

2. The covulcanizable composition of claim 1 wherein said composition comprises a mixture of 20–80% by weight of said butadiene-acrylonitrile copolymer rubber and 80–20% by weight of said epichlorohydrin polymer rubber.

3. The covulcanizable composition of claim 1 wherein said butadiene-acrylonitrile copolymer rubber has a Mooney viscosity, $ML_{1+4}$ (100° C.), of 30–130 and said epichlorohydrin polymer rubber has a Mooney viscosity, $ML_{1+4}$ (100° C.), of 40–140.

References Cited

UNITED STATES PATENTS

| 3,102,102 | 8/1963 | Weidner et al. | 260—887 |
| 3,278,457 | 10/1966 | Milgrom | 260—887 |
| 3,285,804 | 11/1966 | Robinson | 260—887 |
| 3,310,523 | 3/1967 | Lenas | 260—887 |
| 3,351,517 | 11/1967 | Willis | 260—887 |

JOHN C. BLEUTGE, Primary Examiner

U.S. Cl. X.R.

260—37 AL, 41.5 R, 887

UNITED STATES PATENT OFFICE
CERTIFICATE OF CORRECTION

Patent No. 3,639,651     Dated February 1, 1972

Inventor(s) KOMURO ET AL

It is certified that error appears in the above-identified patent and that said Letters Patent are hereby corrected as shown below:

Page 2, in Table 2, the 14th entry under the heading Control 2, delete "-19.3" and insert -- -19.4 --.

Page 2, in Table 2, the 15th entry under the heading Control 2, delete "-2.4" and insert -- -2.3 --.

Page 2, in Table 2, the 17th entry under the heading Control 2, insert -- .4 -- after " + 9".

Page 2, in Table 2, the 18th entry under the heading Control 2, delete ".4".

Page 3, in Table 4, the 4th entry under the heading Example 4, delete "57-51" and insert -- 59-51 --.

Page 4, in Table 8, delete "3" before the word "Control".

Signed and sealed this 13th day of June 1972.

(SEAL)
Attest:

EDWARD M. FLETCHER, JR.
Attesting Officer

ROBERT GOTTSCHALK
Commissioner of Patents